Figure 1:
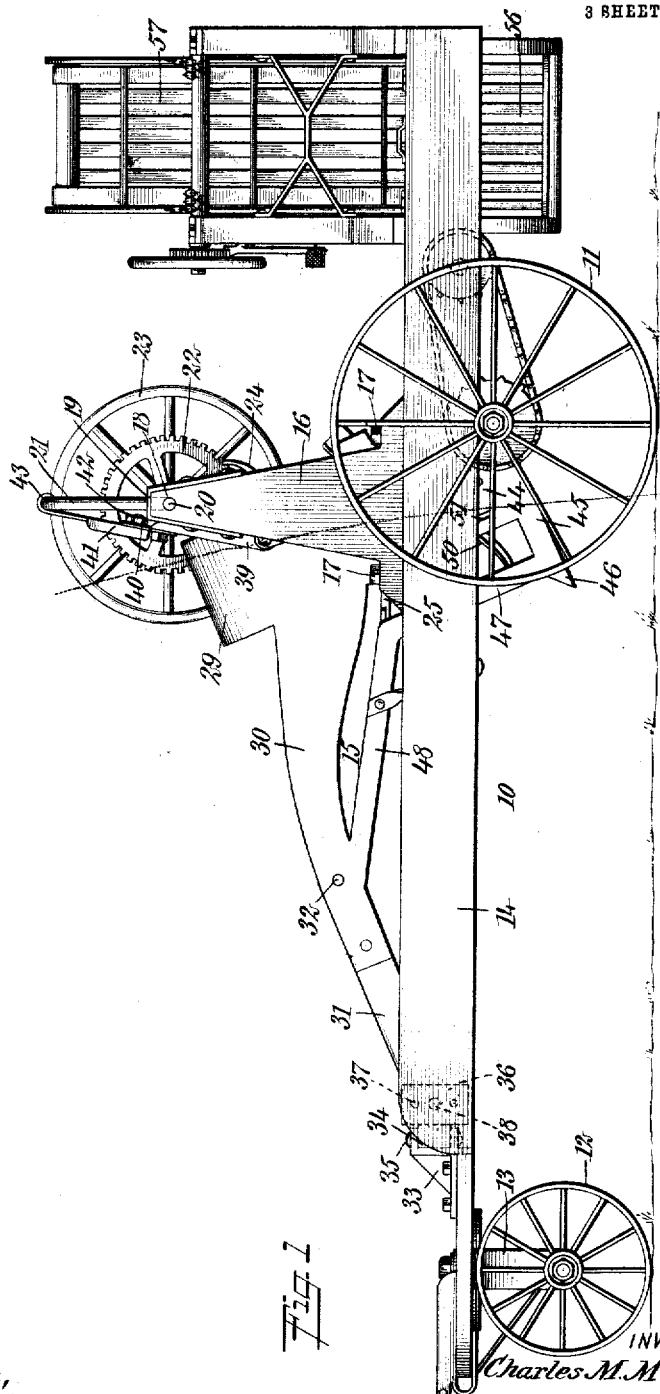

C. M. McCORMICK.
HARVESTER.
APPLICATION FILED JULY 16, 1908.

913,422.

Patented Feb. 23, 1909.
3 SHEETS—SHEET 1.

WITNESSES
E. G. Bromley,
John K. Blackwell

INVENTOR
Charles M. McCormick
BY Munn & Co
ATTORNEYS

C. M. McCORMICK.
HARVESTER.
APPLICATION FILED JULY 16, 1908.

913,422.

Patented Feb. 23, 1909.
3 SHEETS—SHEET 3.

Fig. 3.

WITNESSES
E. G. Bromley
John K. Blackwell

INVENTOR
Charles M. McCormick
BY Munn & Co
ATTORNEYS

UNITED STATES PATENT OFFICE.

CHARLES M. McCORMICK, OF LA JUNTA, COLORADO.

HARVESTER.

No. 913,422.                Specification of Letters Patent.        Patented Feb. 23, 1909.

Application filed July 16, 1908. Serial No. 443,863.

*To all whom it may concern:*

Be it known that I, CHARLES M. McCORMICK, a citizen of the United States, and a resident of La Junta, in the county of Otero and State of Colorado, have invented a new and Improved Harvester, of which the following is a full, clear, and exact description.

This invention relates to harvesters, and more particularly to machines for harvesting crops such as sugar beets and the like, and constitutes an improvement upon the harvester shown in my United States Patent No. 891,184, issued June 16, 1908.

Specifically, the invention relates to a harvester having a plow for digging up the beet roots from the ground, and for advancing the same to a conveyer, which in turn advances them to a suitable receptacle or the like, the plow being provided with a fender adapted to displace severed beet tops or the like from in front of the plow, the latter comprising spaced sides each having a runner formed at the lower end thereof and carrying relatively adjustable, upwardly and rearwardly inclined guide blades for directing the beet roots to the conveyer, the runners having at the forward ends, inwardly disposed and inclined toes. The plow is controlled by suitable means for raising or lowering it and controls the conveyer so that as the plow is raised or lowered the conveyer, too, is correspondingly raised or lowered.

An object of the invention is to provide a harvester for sugar beets and the like, which is simple, and efficient in operation, in which the plow can be operatively and inoperatively arranged in a plurality of positions, and in which a fender is provided for laterally displacing severed beet tops or other foreign bodies from in front of the plow, as the latter travels along.

A further object of the invention is to provide a harvester of the class described, in which the plow has adjustable guide blades to permit its operation with beets or other roots growing at different depths in the soil, and in which the plow itself is adjustable to facilitate its operation under varying conditions.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 2:
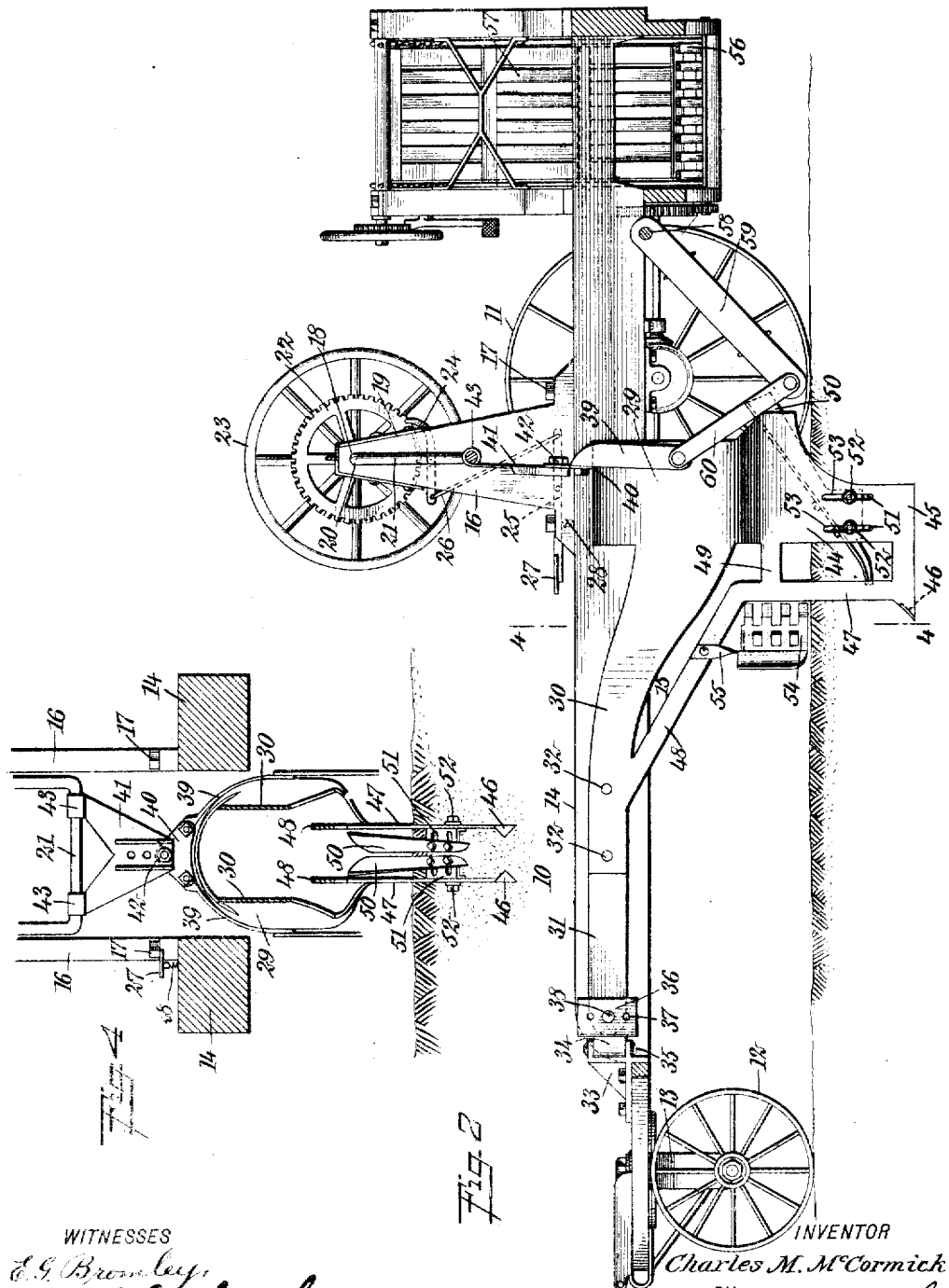

Figure 1 is a side elevation of an embodiment of my invention, showing the plow in raised or inoperative position; Fig. 2 is a longitudinal section of the harvester, showing the plow in a lowered, operative position, partly embedded in the soil; Fig. 3 is a plan view of the harvester; and Fig. 4 is a transverse section on the line 4—4 of Fig. 2.

Before proceeding to a more detailed explanation of my invention, it should be clearly understood that while the same is particularly useful in connection with the harvesting of sugar beets it can also be advantageously employed for a similar purpose in gathering roots or tubers of different kinds, which are cultivated in a manner similar or analogous to the cultivation of sugar beets, and in which it is desired to harvest the roots or tubers by digging them up or removing them from the soil in which they grow. In the accompanying drawings I have shown for example, a wheeled frame which is adapted to travel over the ground, and which carries the plow by means of which the roots are harvested. It will be understood that any other suitable vehicle or frame can be employed for this purpose, and that my invention does not reside in the details of construction shown but that these may be varied to suit individual preference and special conditions.

Referring more particularly to the drawings, I provide a harvester frame 10 which is supported upon wheels 11 and 12. The latter constitute steering wheels, and have an axle 13 pivotally supporting the forward part of the harvester frame. The frame 10 has longitudinal side members 14 which are spaced and between which is located the plow 15. Upon each of the longitudinal members 14 near the rear wheels 11 is located an upright 16, secured in place by means of bolts 17 or in any other convenient manner. At the upper end, each upright has a bearing 18. A U-shaped protective strap 19 is fastened upon the upper end of each upright. A shaft 20 is journaled in the bearings 18 and between the uprights is offset to form a crank 21. Adjacent to one of the uprights the shaft 20 carries rigidly thereupon, a toothed wheel 22 and a hand wheel 23 by means of which the shaft can be manually turned in one direction or the other. A dog 24 is pivoted upon the upright adjacent to the toothed wheel 22 and engages the latter whereby the shaft can be held in any one of a plurality of positions. A lever 25 is pivotally mounted upon the upright carrying the dog 24 and is connected with the latter by means of a link 26. The lever 25 has a pedal 27 which serves to permit the operator to depress the lever with his foot, to displace the dog from engagement with the toothed wheel. A spring 28 holds the lever in a normal position such that the dog is in engagement with the toothed wheel.

The plow 15 has a body 29 which is of inverted U-form and is substantially circular, being tapered slightly toward the forward end of the harvester. The body has forwardly projecting extensions 30, which are inclined toward each other, and which are upwardly curved to a slight extent. The extensions 30 are secured to a plow beam 31 by means of bolts or rivets 32. A bracket 33 is bolted or otherwise rigidly secured at the front of the harvester frame and carries a beam holder 34 which is pivotally secured to the bracket by means of a pin 35. The beam holder has spaced sides 36 provided with a plurality of registering openings 37, and which are adapted to receive the forward end of the beam 31 therebetween, the latter having an opening to receive a pivot pin 38. The same is adapted to be received by any registering pair of the openings 37, pivotally to secure the plow beam to the beam holder. At each side of the body 29 is pivoted an upwardly extending strap 39. The straps are joined by a yoke 40 to which is adjustably secured a connecting bracket 41 by means of a bolt 42, the bracket having a plurality of openings which receive the bolt. At the upper end, the connecting bracket has sleeves 43 which receive the crank 21, whereby the plow can be raised or lowered by means of the hand wheel 23.

The plow body is extended to form downwardly disposed substantially parallel sides 44, the lower ends of which are formed into runners 45. The latter, at the forward extremities, have inclined inwardly disposed toes 46, adapted to loosen the soil from the roots, as the plow travels through the soil. In front of each of the sides 44 is an upright 47 spaced from the side but integral with the runner, the latter projecting forwardly for the purpose. The uprights are extended to form arms 48 which incline upwardly and forwardly and are integral at their upper ends with the extensions 30. A connecting bar 49 joins the upper end of each upright and the corresponding side 44.

I provide guide blades 50 which are of angular cross section and tapered from the rear to the front. The guide blades are mounted upon slotted brackets 51, which adjustably receive holding bolts of the blades. The brackets have bolts 52 which are received by slots 53 in the sides and serve adjustably to mount each of the guide blades at one of the sides 44. The forward ends of the guide blades are outwardly curved and pointed. A fender 54 is mounted in front of the plow, being secured to the arms 48 by means of straps 55. The fender serves to displace laterally, any severed beet tops or other foreign bodies which are in front of the plow.

At the rear of the harvester frame is a slatted receptacle 56 which receives the beets, and a conveyer 57 for removing the beets from the receptacle. The conveyer is operated in any suitable manner from the rear axle of the harvester. The frame of the harvester, at the rear, has a transverse shaft 58 upon which is swung a conveyer 59. The latter has its forward end secured to the body of the plow by means of links 60, so that as the plow is raised or lowered the conveyer 59 is correspondingly raised or lowered. The guide blades 50 have their rear ends disposed over the conveyer and thus direct the beets dug up, to the conveyer. The latter advances the beets to the receptacle 56.

As the plow can be raised or lowered to any desired extent, and as, further, the plow beam itself can be adjusted at its forward end, the device can be adapted for harrowing soils at different depths. Furthermore, the guide blades 50 can be adjusted, owing to the provision of the bolts and slots, for a like purpose. In traveling underneath the soil, the guide blades engage the beet roots at each side of the same and the roots are thus forced upwardly along the guide blades, owing to the forward movement of the same until they fall on to the conveyer 59. The inner edges of the guide blades are rounded to avoid injuring the roots and they are, furthermore, relatively inclined at such an angle that the roots can pass easily along between the same.

Having thus described my invention, I claim as new, and desire to secure by Letters Patent:

1. In a harvester of the class described, a plow comprising a body having spaced sides, and rearwardly and upwardly inclined guide blades each adjustably mounted upon one of said sides, said guide blades tapering toward their forward ends and being of angular section, whereby each guide blade rests against one of said sides and extends outwardly from said side.

2. In a harvester of the class described, a plow comprising a body having downwardly disposed spaced sides terminating at the lower ends in forwardly projecting runners, said runners having inwardly disposed extensions at the forward extremities, and rearwardly tapered and inclined guide blades, each mounted at the inside of one of said sides.

3. In a harvester of the class described, a plow adapted to be raised and lowered and comprising a body, downwardly disposed spaced sides terminating at the lower ends in forwardly projecting runners, said runners having inwardly disposed and inclined toes at the forward extremities, and forwardly tapered and inclined guide blades each adjustably mounted at the inside of one of said sides.

4. In a harvester of the class described, a plow comprising a body having spaces sides provided with slots, and rearwardly and upwardly inclined guide blades of angular cross section and having bolts adjustably received by said slots, said guide blades tapering toward their forward ends.

5. In a harvester of the class described, a plow comprising a body having downwardly disposed substantially parallel sides having at the lower ends forwardly projecting runners, said runners having at the forward ends inwardly disposed and upwardly and rearwardly inclined toes, said body having forwardly projecting extensions, and uprights rigid with said runners and having arms rigid with said extensions, and rearwardly and upwardly inclined guide blades, each adjustably mounted at the inside of one of said sides.

6. In a harvester of the class described, a plow comprising a body having extensions, a beam secured to said extensions, means for pivotally mounting said beam to swing in a plurality of directions, said body having spaced sides provided at their lower ends with forwardly projecting runners, and means for connecting said runners and said extensions.

7. In a harvester of the class described, a plow comprising a body having downwardly disposed substantially parallel sides, and forwardly projecting extensions, a plow beam secured between said extensions, means for mounting said plow beam to swing in a plurality of directions, said sides having at their lower ends, forwardly projecting runners, uprights rigid with said runners and having arms rigid with said extensions.

In testimony whereof I have signed my name to this specification in the presence of two subscribing witnesses.

CHAS. M. McCORMICK.

Witnesses:
BLANCHE RECKORD,
L. McCORMICK.